United States Patent [19]

Shatila et al.

[11] 4,007,292

[45] Feb. 8, 1977

[54] METHOD OF MAKING A PARFRIED FROZEN POTATO PRODUCT

[75] Inventors: Mounir A. Shatila; Samuel J. Huffman, both of Blackfoot, Idaho

[73] Assignee: Ampco Foods Inc., San Francisco, Calif.

[22] Filed: Dec. 5, 1975

[21] Appl. No.: 637,991

[52] U.S. Cl. .................. 426/637; 426/438; 426/516; 426/808

[51] Int. Cl.² .......................... A23L 1/216

[58] Field of Search .......... 426/637, 808, 512, 516, 426/517, 518, 438, 466, 502, 503, 549, 76, 514, 550, 102, 143, 144; D1/13, 14, 21

[56] References Cited

UNITED STATES PATENTS

| | | | |
|---|---|---|---|
| 2,027,596 | 1/1936 | Kurz | 426/102 |
| 2,905,559 | 9/1959 | Anderson et al. | 426/502 |
| 3,061,441 | 10/1962 | Halbach | 426/549 |
| 3,085,020 | 4/1963 | Backinger et al. | 426/637 |
| 3,468,673 | 9/1969 | Keller | 426/637 |
| 3,935,322 | 1/1976 | Weiss et al. | 426/808 |
| D239,215 | 3/1976 | Miller | D1/21 |

*Primary Examiner*—Raymond N. Jones
*Assistant Examiner*—C. A. Fan
*Attorney, Agent, or Firm*—Robert M. Stephenson

[57] ABSTRACT

A parfried frozen potato product suitable for toasting to produce French fries ready for consumption. Potato dough is formed as by extrusion to produce a sheet comprising a multiple of French fry sized units of bodies in side-by-side substantially planar arrangement connected by a thin dough film with a longitudinal central void in each unit. Said sheet is cut to French fry length and then parfried, frozen, and marketed in frozen form.

2 Claims, 3 Drawing Figures

METHOD OF MAKING A PARFRIED FROZEN POTATO PRODUCT

BACKGROUND OF THE INVENTION

1. Field of the Invention

The invention relates to a parfried frozen unit of potato dough comprising French-fry sized bodies connected by a fragile film and a method for manufacturing the same. The unit is prepared for consumption by heating in a bread toaster. The toasted unit is then broken into individual French fries by rupturing the fragile film between the bodies.

2. Description of the Prior Art

The known prior art has many teachings relating to production of French fries from potato dough. In most instances the dough is extruded cross-sectionally as individual fries and then cut to length. In U.S. Pat. No. 3,605,647 the dough pieces are formed sideways by wire cutting. The known prior art does not teach the production of a plurality of parfried frozen French fry bodies which are separated into individual units after preparation for consumption.

Baked items such as waffles are sold in the frozen form and can be prepared for consumption by heating in a standard bread toaster.

Several food products including potato items are sold in the frozen parfried form and can be prepared for consumption by either additional deep fat frying or by heating the frozen products in an oven at about 400°–450° F. to finish the cooking process.

Refrigerated dough items are available and are prepared for consumption by heating in an oven. Baked items such as tarts are stored at room temperature and are prepared for consumption by heating in a toaster.

Prior to this invention, frozen parfried French fries made either from strips of natural potato or from pieces fabricated from a dough were prepared by finishing the cooking in deep hot fat of by finishing the cooking in a heated oven. Although these preparation methods are perfectly satisfactory from a quality standpoint, preparation of small quantities can be wasteful of energy and is time consuming. It is a distinct advance in the art to be able to prepare French fries for consumption by merely placing them in a standard bread toaster for 1–3 minutes. It is a particular advantage when only one or two servings are required. In contrast, heating in an oven requires a long period of time and considerable energy to bring a big oven up to the required temperature of about 450° F. and then about 10 additional minutes baking time is required. When finish frying in deep fat, again considerable time and energy is required to bring the fat in the fryer up to the required approximate temperature of 350° F. This invention discloses a new article of manufacture from which French fries comparable in chemical composition and quality to prior art frozen parfried products can be made. The article is made in a form in which a normal serving of French fries is combined in a single unit and is designed in such a configuration that the unit can be prepared for consumption in a normal bread toaster in 1–3 minutes after which the unit can be separated easily and quickly into the familiar single French fry form. This is a distinct advance in the art and fulfills a long standing need.

SUMMARY OF THE INVENTION

In order to satisfy a demand for French fries of excellent quality which can be prepared for consumption in a few minutes from the frozen state, it has been discovered that a dough comprising essentially of intact single cooked potato cells, binder, and water can be extruded cross-sectionally through a special multiple die to produce a plurality of parallel substantially planar French fry forms interconnected by a thin film of dough to form a single dough sheet which can then be cross cut into units of desired French fry lengths such as 3½–4½ inches. These units can then be parfried and frozen and distributed in the frozen form until they are desired for consumption. A frozen unit can then be prepared for consumption by a high temperature-short time heat treatment for 1–3 minutes such as in a standard bread toaster. After toasting, the individual French fries can be separated from the unit by breaking apart along the connecting thin film line.

The problem of severe blistering encountered in frying extruded potato doughs has been controlled by spraying the extruded units with water immediately before parfrying, following the teaching of U.S. Pat. No. 3,883,671. It has been discovered that blistering can also be controlled and parfrying as well as final preparation time can both be reduced further by mounting rods within the extrusion die so that each French fry body is extruded with a central interior void. During the parfrying step, much of the moisture from the dough transferred from this interior core opening rather than having to be released by penetrating the exterior shell. This materially reduces the parfrying time and the blistering. It has further been discovered that the thin dough film can be rendered more easily rupturable after final frying by perforating the film at the time of extrusion. This invention thus results in a new article of manufacture not known in the prior art which can be prepared for consumption from the frozen state in a much shorter time and with the use of much less energy to produce excellent crisp French fries by heating for 1–3 minutes in a standard bread toaster.

DESCRIPTION OF THE PREFERRED EMBODIMENT

A potato dough is formed with the following composition:

| | |
|---|---|
| Potato Granules | 90.0% |
| Raw Starch | 7.0% |
| Guar Gum | 1.5% |
| Salt | 1.5% |
| | 100.0% |

The above dry formulation is uniformly mixed with about 2.26 parts by weight of water at 140° F. ± 2° F. to form a dough of about 29% solids and 71% water.

Figure 1:
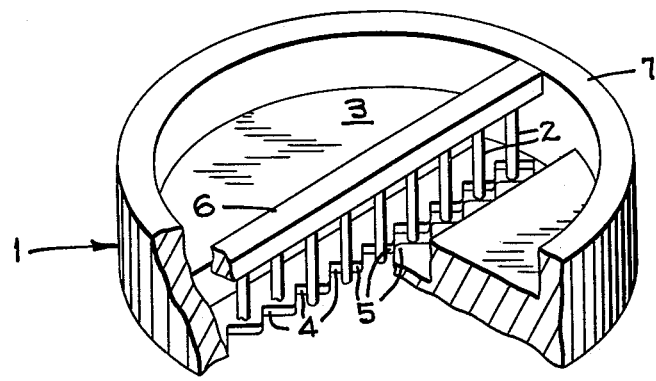
FIG. 1 is a partially sectioned isometric drawing of the extruder die looking in the direction of extrusion.
Figure 2:
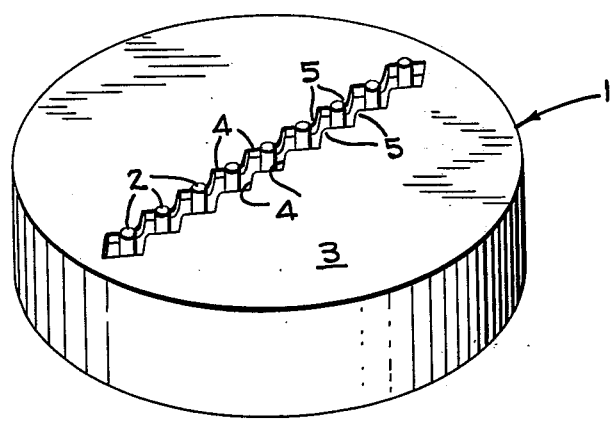
FIG. 2 is an isometric drawing of the discharge side of the die of FIG. 1.
Figure 3:
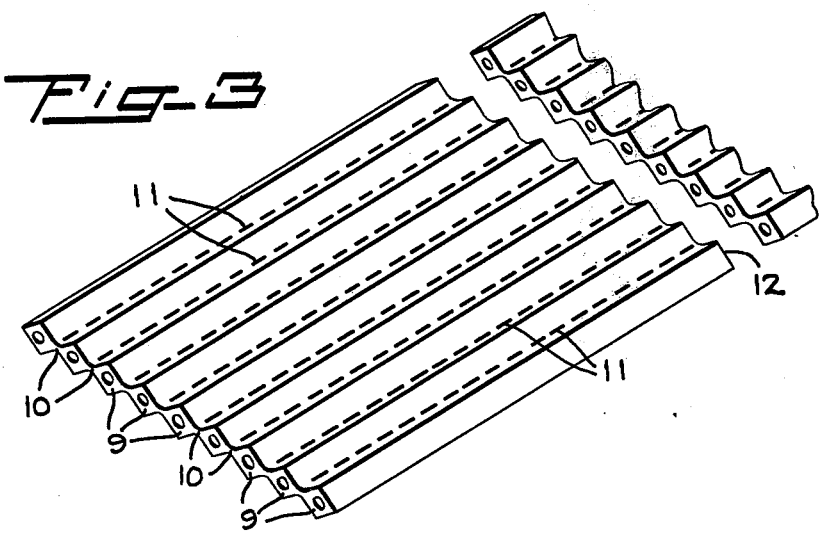
FIG. 3 is an isometric drawing showing an exemplary completed unit.

The dough is then fed to an extruder and passed as a sheet through the extruder head 1 shown in FIG. 1. The dough flows around core rods 2 which are ⅛ inch in diameter and extend through the base plate 3. The core rods are attached to cross member 6 which is secured to the die wall 7 and are thus suspended rigidly in die openings 4. The dough then passes through die openings 4 shown best in FIG. 2. These openings are ⅜ × ⅜ inches and are interconnected by narrow openings 5 which are 3/32 × 3/32 inches. The formed dough then exits from the die in the form of a sheet consisting of nine French fry shaped bodies interconnected by a thin film. The embodiment of FIG. 3 has individual French fry shaped bodies 9 of diamond configuration, the lateral vertices of adjacent bodies being juxtaposed in parallelly aligned spaced-apart relationship. Thin films 10 span the space between adjacent vertices to retain the bodies in a unitary separable unit. The thin film connecting strips are then perforated to form slots 3/16 inches long and 3/32 inches wide spaced 1/16 inch apart as shown at 11 in FIG. 3. This perforating unit is not shown. The perforated sheet is then cross cut to 4½ inches lengths to form the units shown in FIG. 3. The formed units are discharged into a deep fat fryer operated at 350° F. and with a residence time of about 90 seconds to parfry to a moisture content of about 42.0% and an oil content of about 18.0%. The units are then drained to remove excess fat and are quick frozen such as by discharging the units in single layer depth into a blast freezer operating at a temperature of −10° F. and a residence time of 15 minutes. The frozen units are then packaged and stored at 0° to −10° F. until they are desired for consumption.

To prepared for consumption, frozen units are placed directly into a standard bread toaster and toasted for 1–3 minutes. The toasted unit is then removed from the toaster and broken along the perforated thin film 10 into individual French fries. The finished French fries have a desirable crisp shell, much like deep fat fried French fries. There is no oil drip in the toaster.

In the research leading to the above preferred embodiment, several other embodiments were developed within the scope of the invention. For example, a simple die not containing core rods is used in extrusion. The extruded units, when parfried, tend to form undesirable blisters because all steam liberated during the deep fat parfrying has to force its way out through the extruded surfaces. Then this die is used, blistering is largely controlled by following the teaching of U.S. Pat. No. 3,883,671 wherein water is sprayed on the crosscut units immediately before parfrying. The use of core rods 2 in the extruder die is preferred since this allows part of the moisture to pass from the French fry forms through the central void instead of through the outer surfaces, thus reducing blistering. Furthermore, the central void allows the preferred moisture content to be reached more quickly during parfrying and contributes to a shorter preparation time and a more crisp end product after final toasting.

In another embodiment, the thin film between the French fry forms is not perforated. Although the toasted product can be readily separated into individual fries, perforation of this connecting film makes separation easier.

One skilled in this art knows that French fries are made in a variety of lengths and cross sectional configurations. This invention can be used to produce French fries of any size, configuration and length. On sizes larger than ⅜ inch in cross section, such as ½ inch, it has been found beneficial to increase the diameter of the core rods accordingly to as much as 3/16 inch to control preparation time and crispness. On sizes smaller than ⅜ inch in cross section, such as ¼ inch, the core rod is correspondingly smaller, such as 1/16 inch.

The composition of the potato dough used is not critical for producing this new article of manufacture. It is only required that the dough lends itself to forming into a unit which essentially maintains its form during parfrying. The dough described is preferred because it has freeze-thaw stability and the frozen parfried units made from the dough disclosed herein can even be thawed prior to toasting, although this is not a preferred procedure. The dough solids must have a substantial proportion of intact cooked potato cells, since French fries made from natural raw potato strips are essentially that and natural texture cannot be duplicated if appreciable broken potato cells are present. It is obvious to one skilled in this art that the required intact cooked potato cells can come from dehydrated instant mashed potato products, such as the potato granules used in the preferred embodiment, or from cooked undried potatoes or mixtures of the two, providing a formable dough in the range of about 60–77% moisture and 40–23% solid matter by weight is used.

Parfrying is preferably conducted at a fat temperature in the range of 330°–360° F. The residence time in the parfryer is in the range of 60 to 120 seconds to produce a parfry with a moisture content in the range of 35–45% by weight and a fat content in the range of 10–20%. The parfried product is browned during the parfrying step and needs only to be heated throughout to prepare for consumption.

Although extrusion of food products with central voids is known in the prior art, and other foods have been prepared for consumption by insertion in a bread toaster, this invention for the first time discloses a new article of manufacture adapted for preparing excellent crisp individual French fries in a toaster in 1–3 minutes from a parfried frozen multiple unit thereby materially reducing time of preparation and energy required.

Although frozen French fries have for years been the largest single frozen food product on the market, reaching sales of more than 2.5 billion pounds in 1974, the new article of manufacture disclosed herein has not heretofore been suggested, inferred or taught. This new article of manufacture has filled an obvious need in the market.

This invention makes available for the first time a frozen parfried product which can be quickly and conveniently readied for consumption in individual servings. Although several embodiments have been shown and described, it is obvious that other adaptations and modifications can be made without departing from the true spirit and scope of the invention.

What is claimed is:

1. A process for producing an extruded parfried quickfrozen unit suitable for toasting either in frozen or thawed state to produce French fried potatoes, comprising the steps of:
   a. providing a quantity of formable potato dough consisting of 23–40% solids and 60–77% water by weight, said solids comprising essentially intact cooked separated potato cells about 1.5% guar gum and about 7% raw starch, all by weight;
   b. extruding said dough into a continuous extrudate having a plurality of French fry forms in parallel substantially planar relationship, each form having a central longitudinal void extending throughout, said forms being interconnected by a thin, narrow, easily rupturable film of said dough;

c. crosscutting said extrudate to form a unit having dimensions approximating a standard slice of bread;

d. browning said unit by parfrying for about 90 seconds in fat at a temperature of 330°–360° F. to reduce the moisture content to 35–45% by weight and to impart freeze thaw stability;

e. quick freezing the browned parfried unit; and f. storing the quick frozen unit at 0° to −10° F. until desired for consumption.

2. The process as recited in claim 1 wherein said intact cells are potato granules and the said water component of said dough is added at a temperature of 140° F. ±2° F.

* * * * *